(12) United States Patent
Sakuramoto

(10) Patent No.: US 12,017,372 B2
(45) Date of Patent: Jun. 25, 2024

(54) ROBOT CONTROL DEVICE

(71) Applicant: Mitsubishi Electric Corporation, Tokyo (JP)

(72) Inventor: Yasunori Sakuramoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/571,741

(22) PCT Filed: Sep. 8, 2021

(86) PCT No.: PCT/JP2021/032995
§ 371 (c)(1),
(2) Date: Dec. 19, 2023

(87) PCT Pub. No.: WO2023/037443
PCT Pub. Date: Mar. 16, 2023

(65) Prior Publication Data
US 2024/0123627 A1    Apr. 18, 2024

(51) Int. Cl.
*B25J 9/16*        (2006.01)
*B25J 19/02*       (2006.01)

(52) U.S. Cl.
CPC .......... *B25J 9/1697* (2013.01); *B25J 9/1664* (2013.01); *B25J 19/023* (2013.01)

(58) Field of Classification Search
CPC ....... B25J 9/1697; B25J 9/1664; B25J 19/023
See application file for complete search history.

(56) References Cited

U.S. PATENT DOCUMENTS 9,452,532 B2    9/2016  Komatsu et al.
10,324,425 B2   6/2019  Takahashi
(Continued)

FOREIGN PATENT DOCUMENTS

CN    108621205 A    10/2018
JP    S60-131192 A    7/1985
(Continued)

OTHER PUBLICATIONS

N. Najmaei and M. R. Kermani, "Applications of Artificial Intelligence in Safe Human-Robot Interactions," in IEEE Transactions on Systems, Man, and Cybernetics, Part B (Cybernetics), vol. 41, No. 2, pp. 448-459, Apr. 2011, doi: 10.1109/TSMCB.2010.2058103. (Year: 2011).*

(Continued)

*Primary Examiner* — Abby Y Lin
*Assistant Examiner* — Dylan Brandon Mooney
(74) *Attorney, Agent, or Firm* — XSENSUS LLP

(57) ABSTRACT

A robot control device controls a robot. The robot control device includes an image recognition processing unit, a robot control processing unit, and a monitoring processing unit. The image recognition processing unit recognizes first information on the basis of measurement data in a monitoring area obtained from a vision sensor, the first information being information about a human present in the monitoring area. The robot control processing unit controls the motion of the robot in accordance with a motion program for moving the robot. On the basis of surrounding object data and the first information obtained from the image recognition processing unit, the monitoring processing unit determines a possibility of pinching of the human between the robot and a surrounding object. The surrounding object data is data indicating three-dimensional disposition states of the robot and a surrounding object that is an object other than the robot in the monitoring area.

15 Claims, 11 Drawing Sheets

(56) References Cited

U.S. PATENT DOCUMENTS

| | | | |
|---|---|---|---|
| 10,710,241 B2 | 7/2020 | Oyama et al. | |
| 10,759,064 B2 | 9/2020 | Takemoto et al. | |
| 10,828,776 B2 | 11/2020 | Oyama | |
| 10,953,538 B2 | 3/2021 | Matsudaira et al. | |
| 11,192,244 B2 | 12/2021 | Nakamura et al. | |
| 11,338,439 B2 | 5/2022 | Iwayama | |
| 11,345,036 B2 | 5/2022 | Ueno | |
| 2014/0067121 A1* | 3/2014 | Brooks | B25J 9/1676 700/255 |
| 2017/0113349 A1 | 4/2017 | Naitou et al. | |
| 2018/0107174 A1* | 4/2018 | Takahashi | G05B 9/02 |
| 2019/0047143 A1 | 2/2019 | Matsudaira et al. | |
| 2019/0160668 A1 | 5/2019 | Oyama | |
| 2020/0130187 A1* | 4/2020 | Iwayama | B25J 9/1676 |
| 2022/0105634 A1* | 4/2022 | Oboril | G09B 19/24 |

FOREIGN PATENT DOCUMENTS

| | | |
|---|---|---|
| JP | 2004-174644 A | 6/2004 |
| JP | 2008-137127 A | 6/2008 |
| JP | 2009-090400 A | 4/2009 |
| JP | 2015-157352 A | 9/2015 |
| JP | 2016-078189 A | 5/2016 |
| JP | 2017-077608 A | 4/2017 |
| JP | 2017-144490 A | 8/2017 |
| JP | 2018-065221 A | 4/2018 |
| JP | 2019-030941 A | 2/2019 |
| JP | 2019-042871 A | 3/2019 |
| JP | 2019-063974 A | 4/2019 |
| JP | 2019-081234 A | 5/2019 |
| JP | 2019-098410 A | 6/2019 |
| JP | 2020-066092 A | 4/2020 |
| JP | 2020-082307 A | 6/2020 |
| JP | 2020-097088 A | 6/2020 |
| JP | 2020-142344 A | 9/2020 |
| JP | 2021-020287 A | 2/2021 |

OTHER PUBLICATIONS

L. S. Scimmi, M. Melchiorre, S. Mauro and S. P. Pastorelli, "Implementing a Vision-Based Collision Avoidance Algorithm on a UR3 Robot," 2019 23rd International Conference on Mechatronics Technology (ICMT), Salerno, Italy, 2019, pp. 1-6, doi: 10.1109/ICMECT.2019.8932105. (Year: 2019).*

Notice of Reasons for Refusal dated Mar. 22, 2022, received for JP Application 2022-506319, 11 pages including English Translation.

International Search Report and Written Opinion dated Nov. 22, 2021, received for PCT Application PCT/JP2021/032995, filed on Sep. 8, 2021, 15 pages including English Translation.

Chinese Office Action issued Apr. 26, 2024, in corresponding Chinese Patent Application No. 202180098461.5, 14pp.

* cited by examiner

FIG.2

| INPUT DATA | | | | OUTPUT DATA |
|---|---|---|---|---|
| CONTACT PART OF HUMAN | STATE OF HUMAN | CONTACT PART OF ROBOT | STATE OF ROBOT | DEGREE OF INFLUENCE ON HUMAN BODY |
| HEAD | MOVING | ALL PARTS | MOVING SPEED > 0.0 m/s | HIGH |
| | AT STOP | ALL PARTS | MOVING SPEED > 0.0 m/s | HIGH |
| TORSO | MOVING | PART WITH SMALL CONTACT AREA (POINTED PART SUCH AS HAND) | MOVING SPEED > 0.0 m/s | HIGH |
| | | PART WITH LARGE CONTACT AREA | MOVING SPEED > 0.1 m/s | HIGH |
| | AT STOP | PART WITH SMALL CONTACT AREA | MOVING SPEED > 0.0 m/s | HIGH |
| | | PART WITH LARGE CONTACT AREA | MOVING SPEED > 0.25 m/s | HIGH |
| ⋮ | | | | |

FIG.8

| 50 | 55 | 60 | 60 | 65 | 65 | 60 | 60 | 55 | 50 |
|---|---|---|---|---|---|---|---|---|---|
| 50 | 55 | 60 | 60 | 65 | 65 | 60 | 60 | 55 | 50 |
| 20 | 25 | 30 | 35 | 40 | 40 | 35 | 30 | 25 | 20 |
| 10 | 15 | 10 | 6 | 25 | 25 | 6 | 10 | 10 | 10 |
| 8 | 8 | 0 | 0 | 0 | 0 | 0 | 0 | 0 | 8 |
| 5 | 0 | 0 | 0 | 0 | 0 | 0 | 0 | 0 | 5 |
| 0 | 0 | 0 | 0 | 0 | 0 | 0 | 0 | 0 | 0 |
| 0 | 0 | 0 | 0 | 0 | 0 | 0 | 0 | 0 | 0 |

ROBOT CONTROL DEVICE

CROSS-REFERENCE TO RELATED APPLICATION

This application is based on PCT filing PCT/JP2021/032995, filed Sep. 8, 2021, the entire contents of which are incorporated herein by reference.

FIELD

The present disclosure relates to a robot control device to control a robot that operates sharing a work space with a human, a learning device, and an inference device.

BACKGROUND

A human-robot cooperation system, which allows a human worker and a robot to share a work space without a safety fence being provided therebetween, has been developed in the field of industrial robots etc. For the human-robot cooperation system, the worker may enter a range of motion of the robot, and interfere with the robot. To address this, a technique for preventing interference between the worker and the robot has been proposed.

Patent Literature 1 discloses a robot control method including measuring a distance between a robot recognized from image information imaged by a camera and a worker present in the vicinity of the robot, and, if the measured distance is a distance that causes interference of the robot with the worker, presuming how the robot interferes with which part of the worker, and restricting the motion of the robot on the basis of a result of the presumption.

CITATION LIST

Patent Literature

Patent Literature 1: Japanese Patent Application Laid-open No. 2008-137127

SUMMARY OF INVENTION

Problem to be Solved by the Invention

The above-described conventional technique, which presumes the interference between the worker and the robot only from the image information, fails to take into consideration a surrounding object which is an object disposed around the worker and the robot. That is, the conventional technique poses a problem of failure to take into consideration a possibility of pinching of the worker between the robot and the surrounding object. For example, a mode of interference between the worker and the robot is presumed from a distance between the worker and the robot when a part of the body of the worker is present between the robot and the surrounding object. As a result, the motion of the robot is slowed down, in which case the part of the body of the worker is likely to be pinched between the robot and the surrounding object because of failure to take the presence of the surrounding object into consideration.

The present disclosure has been made in view of the above, and an object thereof is to provide a robot control device capable of preventing a human from being pinched between a robot and a surrounding object.

Means to Solve the Problem

In order to solve the above-described problem and achieve the object, the present disclosure provides a robot control device to control a robot that operates sharing a work area with a human, the robot control device comprising an image recognition processing unit, a robot control processing unit, and a monitoring processing unit. The image recognition processing unit recognizes first information on a basis of measurement data in a monitoring area obtained from a vision sensor, the first information being information about a human present in the monitoring area. The robot control processing unit controls a motion of the robot in accordance with a motion program for moving the robot. The monitoring processing unit to determine a possibility of pinching of the human between the robot and the surrounding object, on a basis of surrounding object data and the first information, the first information being obtained from the image recognition processing unit. The surrounding object data indicates three-dimensional disposition states of the robot and a surrounding object in the monitoring area, the surrounding object being an object other than the robot.

Effects of the Invention

The robot control device according to the present disclosure achieves an effect of preventing the human from being pinched between the robot and the surrounding object.

BRIEF DESCRIPTION OF DRAWINGS

FIG. 2 is a diagram illustrating an example of human body influence degree information.

FIG. 8 is a diagram illustrating an example of an access frequency map.

DESCRIPTION OF EMBODIMENTS

A robot control device, a learning device, and an inference device according to each embodiment of the present disclosure will be hereinafter described in detail with reference to the drawings.

First Embodiment

Figure 1:
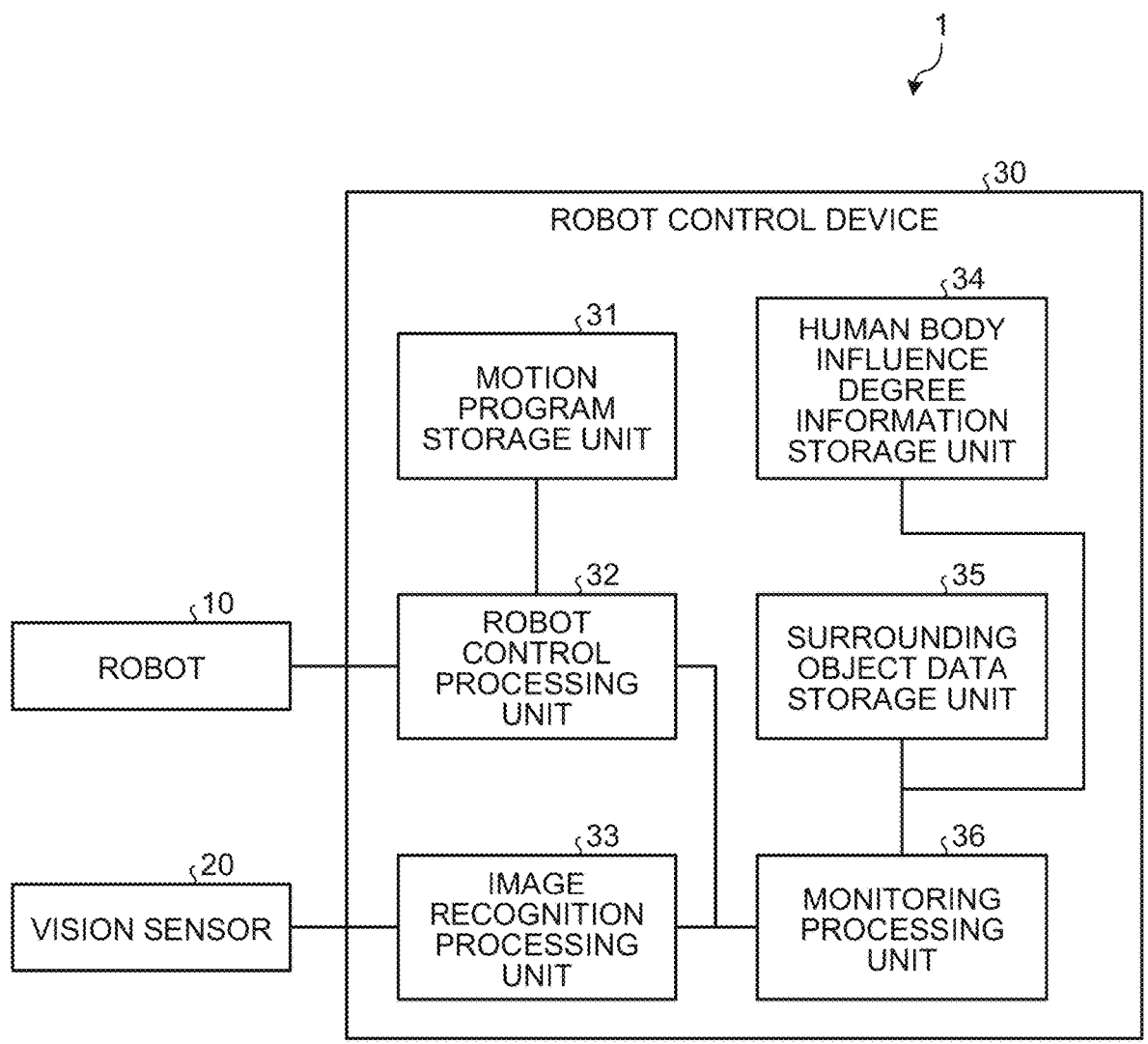
FIG. 1 is a block diagram illustrating an example of a configuration of a robot system including a robot control device according to a first embodiment.

FIG. 1 is a block diagram illustrating an example of a configuration of a robot system including a robot control device according to a first embodiment. A robot system 1 includes a robot 10, a vision sensor 20, and a robot control device 30.

In one example, the robot 10 includes a plurality of arms and a drive unit. The dive unit is provided in each joint. The joint is a coupling point of each arm. The drive unit controls a joint angle. The robot 10 can take various postures in response to a motion command from the robot control device 30. By taking various postures, the robot can operate at a position within a predetermined range centered on a position where the robot 10 is fixed. An example of the drive unit is an electric motor such as a servo motor or a stepping motor. Alternatively, the drive unit is, for example, a cylinder using air pressure or hydraulic pressure.

The vision sensor 20 images a predetermined area including the robot 10. That is, the vision sensor 20 images a monitoring area of the robot system 1. The vision sensor 20 is a sensor capable of acquiring measurement data including a distance image including a depth of an object in the monitoring area and a color image for distinguishing between a human and a surrounding object other than the human. An example of the vision sensor 20 is a two-dimensional camera or a three-dimensional camera. Color information can be acquired by the two-dimensional camera, and position information can be acquired by the three-dimensional camera. An imaging method performed by the three-dimensional camera can be a stereo method, a time of flight (ToF) method, or a projector method.

Assume that a surrounding object is disposed in addition to the robot 10 in the monitoring area of the robot system 1. Examples of the surrounding object include a table, a wall, a shelf, a door, and a processing machine.

The robot control device 30 controls the motion of the robot 10 in accordance with a motion program which is a predetermined program for moving the robot 10. During a control process of the robot 10, the robot control device 30 controls the motion of the robot 10 on the basis of an imaging result provided by the vision sensor 20, so as to prevent contact between the robot 10 and a human in a case where that human is present around the robot 10. The robot control device 30 includes a motion program storage unit 31, a robot control processing unit 32, an image recognition processing unit 33, a human body influence degree information storage unit 34, a surrounding object data storage unit 35, and a monitoring processing unit 36.

The motion program storage unit 31 stores a motion program that describes the motion of the robot 10.

The robot control processing unit 32 loads the motion program from the motion program storage unit 31 to execute the motion program, and controls the robot 10 in accordance with a result of the execution. In addition, in a case where a command to restrict the motion of the robot 10 is issued by the monitoring processing unit 36 when the robot control processing unit 32 controls the robot 10 in accordance with the motion program, the robot control processing unit 32 controls the robot 10 in accordance with the command.

The image recognition processing unit 33 recognizes first information on the basis of measurement data in the monitoring area obtained from the vision sensor 20. The first information is information about a human present in the monitoring area. An example of the measurement data is a distance image or a color image. In one example, the image recognition processing unit 33 determines whether a human is present in the monitoring area, by using a color image of the measurement data, and recognizes human body parts in a case where the human is present in the monitoring area. Examples of the human body parts include a head, a torso, an upper arm, a forearm, a hand, a thigh, a lower leg, and a foot. The image recognition processing unit 33 can recognize the human body parts by comparing the measurement data with data that stores the human body parts in advance. In a case where a human is present in the monitoring area, the image recognition processing unit 33 recognizes, by using a distance image of the measurement data, first position and posture information and first state information. The first position and posture information is information including the position and posture of the recognized human. More specifically, the first position and posture information is information including the positions and postures of the human body parts. The first state information is information including the state of the human. The first position and posture information indicates positions and postures of the human and the human body parts in a camera coordinate system which is a coordinate system used in the measurement data measured by the vision sensor 20. The first state information is information indicating how each human body part is moving. For example, the first state information is information including a moving direction and a speed, of each human body part. In a case where a human body part is a, a stop, the moving direction and the speed are "0". The first position and posture information and the first state information are included in the first information. In addition, similarly, the image recognition processing unit 33 may further recognize second information for the robot 10. The second information is information about the robot. The second information includes, for each part of the robot 10, second position and posture information and second state information. The second position and posture information is information including a position and a posture, of the part of the robot. The second state information is is information including a state of the part of the robot.

The human body influence degree information storage unit 34 stores human body influence degree information which is information indicating the degree of influence on the human body when the robot 10 comes into contact with the human. In the human body influence degree information, the degree of influence on the human body in the case of the human body coming into contact with the robot 10 is defined for each of the human body parts. FIG. 2 is a diagram illustrating an example of the human body influence degree information. In one example, the human body influence degree information is information including input data that is a state of contact between the human and the robot 10, and output data that is the degree of influence on the human body. In the example in FIG. 2, the input data includes items indicating a contact part of the human, a state of the human, a contact part of the robot 10, and a state of the robot 10. Note that the items of the input data in FIG. 2 are merely examples, and are not limited thereto. The output data includes an item indicating the degree of influence on the human body. Each item of the input data is information obtained as a result of a recognition process by the image recognition processing unit 33 and a result of a specifying process by the monitoring processing unit 36. Examples of the degree of influence on the human body include the degree of impact on the human body and the degree of injury or damage to the human body. For example, in a case where the human body is damaged, the degree of influence on the human body is "high", and in a case where the human body is not damaged, the degree of influence on the human body is "low". In the example in FIG. 2, the degree of influence on the human body is "high" in a case where the contact part of the human is "head", the state of the human is "moving", the contact part of the robot 10 is "all parts", and the state of the robot 10 is "moving speed>0.0 m/s". In one example, the human body influence degree information is "Biomechanical limits" shown in Table A.2 of International Organization for Standardization/Technical Specifications (ISO/TS) 15066: 2016.

The surrounding object data storage unit 35 stores surrounding object data. The surrounding object data is information including three-dimensional disposition states of the robot 10 and a surrounding object which is an object other than the robot 10 present in the monitoring area. The surrounding object data includes three-dimensional computer-aided design (CAD) data and position and posture data. The CAD data indicates the shape and size of the object. The position and posture data indicates the position and posture at which the object is installed. In one example, the position and posture data is data indicating a position and posture based on an installation position of the robot 10. The surrounding object data is data that can three-dimensionally reproduce disposition states of objects including the robot 10 in the monitoring area. The surrounding object data is expressed using a robot coordinate system which is a coordinate system used in the surrounding object data.

Using a recognition result of the image recognition processing unit 33, the monitoring processing unit 36 takes into consideration a distance between the human and the robot 10, the presence or absence of the possibility of contact, and the degree of influence at the time of contact, and, if there is a possibility that the robot 10 will affect a human, outputs, to the robot control processing unit 32, a command to restrict the motion of the robot 10. Each of specific processes by the monitoring processing unit 36 will be described below.

The monitoring processing unit 36 measures a measurement distance on the basis of the recognition result of the image recognition processing unit 33. The measurement distance is a distance between the human and the robot 10. The monitoring processing unit 36 determines whether the measurement distance is a non-contact distance. The non-contact distance is a distance over which the motion of the robot 10 does not cause the contact of the robot 10 with the human. The non-contact distance is acquired from motion stop data which is data indicating how much distance in which direction is required to stop the robot 10 from the time point of imaging by the vision sensor 20. As a result, the monitoring processing unit 36 measures the measurement distance between the human and the robot 10, which distance includes a distance the robot 10 coasts until the robot 10 stops. In a case where the measurement distance is the non-contact distance, the monitoring processing unit 36 does not restrict the robot 10 and allows the robot 10 to continue the current operation. In a case where the measurement distance is not the non-contact distance, the monitoring processing unit 36 transmits, to the robot control processing unit 32, a command to change the motion speed of the robot 10 such that the robot 10 slows.

In the case where the measurement distance is not the non-contact distance, that is, in a case where the measurement distance is a distance over which the human and the robot 10 are likely to contact each other, the monitoring processing unit 36 determines whether the motion of the robot 10 causes contact with the human. In one example, from the first information on the human, which is the recognition result of the image recognition processing unit 33, and the second information on the robot 10, the monitoring processing unit 36 determines whether the robot 10 comes into contact with the human. As described above, the first information includes the first position and posture information on the human body parts, and the first state information on the human body parts while the second information includes the second position and posture information on the parts of the robot 10, and the second state information on the parts of the robot 10. In addition, in a case where the robot 10 comes into contact with the human, the monitoring processing unit 36 predicts, from a predicted motion of each human body part and a predicted motion of the robot 10, a contact part and a contact state between the robot 10 and a human body part. In one example, the monitoring processing unit 36 specifies contact-time position and posture information, and contact-time state information. The contact-time position and posture information includes the human body part and the part of the robot 10 that contact each other and the postures of the then human and robot. The contact-time state information is states of the human body part and the robot 10 that contact each other. In one example, the contact-time position and posture information includes the human body part that is in contact with the robot 10 and a contact angle thereof, and the part of the robot 10 that is in contact with the human and a contact angle thereof. The contact-time state information includes moving directions and speeds of the human body part and the part of the robot 10 at the time of contact. The contact-time state information indicates that both the moving direction and the speed are "0" where the human body part and the part of the robot 10 are at a stop.

Instead of the recognition result of the image recognition processing unit 33, a result of a simulation of allowing the robot control processing unit 32 to move the robot 10 in accordance with the motion program may be used as the second position and posture information on the part of the robot and the second state information on the part of the robot 10 for determining the motion that is the contact of the robot 10 with the human. In a case where the robot 10 does not contact the human, the monitoring processing unit 36 allows the robot 10 to continue the motion, maintaining restrictions on the motion of the robot 10.

In the case where the robot 10 will contact the human, the monitoring processing unit 36 consults the human body influence degree information in the human body influence degree information storage unit 34 and extracts the degree of influence on the human body from the specified parts and states of the robot 10 and the human that in contact with each other. That is, the monitoring processing unit 36 extracts human body influence degree information corresponding to a combination of the contact-time position and posture information and the contact-time state information. Then, the monitoring processing unit 36 outputs, to the robot control processing unit 32, a command of the motion of the robot 10 in accordance with the acquired degree of influence on the human body. In one example, in a case where the degree of influence on the human body is high, the monitoring processing unit 36 transmits, to the robot control processing unit 32, a command for further restricting the motion of the robot 10. Examples of the restriction of the motion of the robot 10 include stop of the robot 10 and a motion of the robot 10 in a direction away from the human.

In addition, on the basis of: the surrounding object data indicating the three-dimensional disposition states of the robot 10 and a surrounding object in the monitoring area; and the first information obtained from the image recognition processing unit 33, the monitoring processing unit 36 determines the possibility of pinching of the human between the robot 10 and the surrounding object, and determines whether further restriction of the motion of the robot 10 or output of a warning sound is necessary, in a case where the degree of influence of the contact between the robot 10 and the human on the human body is not high. To determine the possibility of pinching of the human between the robot 10 and the surrounding object, the monitoring processing unit 36 adds position information on the human, to the surrounding object data on the basis of the first information, the surrounding object data including the positions, shapes, and sizes of the robot 10 and the surrounding object in the monitoring area, and predicts the motion of the human and the motion of the robot 10 on the basis of the first information. Furthermore, the monitoring processing unit 36 may determine the possibility of pinching of the human between the robot 10 and the surrounding object by including not only the first information but also the second information. In that case, the monitoring processing unit 36 predicts the motion of the robot 10 from the second information including the second position and posture information and the second state information.

Specifically, the monitoring processing unit 36 adds, to the surrounding object data in the robot coordinate system, the position information on the human in the camera coordinate system recognized by the image recognition processing unit 33, that is, the position information on each part of the human body, simulates the motion of the human and the motion of the robot 10, and thus determines whether the human will be pinched between the robot 10 and the surrounding object. At that time, calibration between the camera coordinate system and the robot coordinate system is performed in advance. As a result, a coordinate transformation matrix between the camera coordinate system and the robot coordinate system is calculated. With the use of this coordinate transformation matrix, the position of the human in the camera coordinate system recognized by the vision sensor 20 can be transformed into that in the robot coordinate system. The position and posture of the surrounding object are also represented by using coordinates based on the robot 10. Therefore, the monitoring processing unit 36 can know a positional relationship among the robot 10, the surrounding object, and the human in the robot coordinate system, and determines from this positional relationship whether the human is at a position where the human will be pinched. The simulation of the motion of the human can be performed on the basis of the first information. The simulation of the motion of the robot 10 can be performed by using the motion program or on the basis of the second information.

In a case where there is no possibility of pinching of the human, the monitoring processing unit 36 allows the robot 10 to continue the motion, maintaining restrictions on the motion of the robot 10. That is, the monitoring processing unit 36 does not impose further restriction on the motion. In a case where there is a possibility of pinching of the human, the monitoring processing unit 36 outputs, to the robot control processing unit 32, a command to restrict the motion of the robot 10, such as stop of the robot 10 and a motion of the robot 10 in a direction away from the human, or outputs a warning sound.

Figure 3:
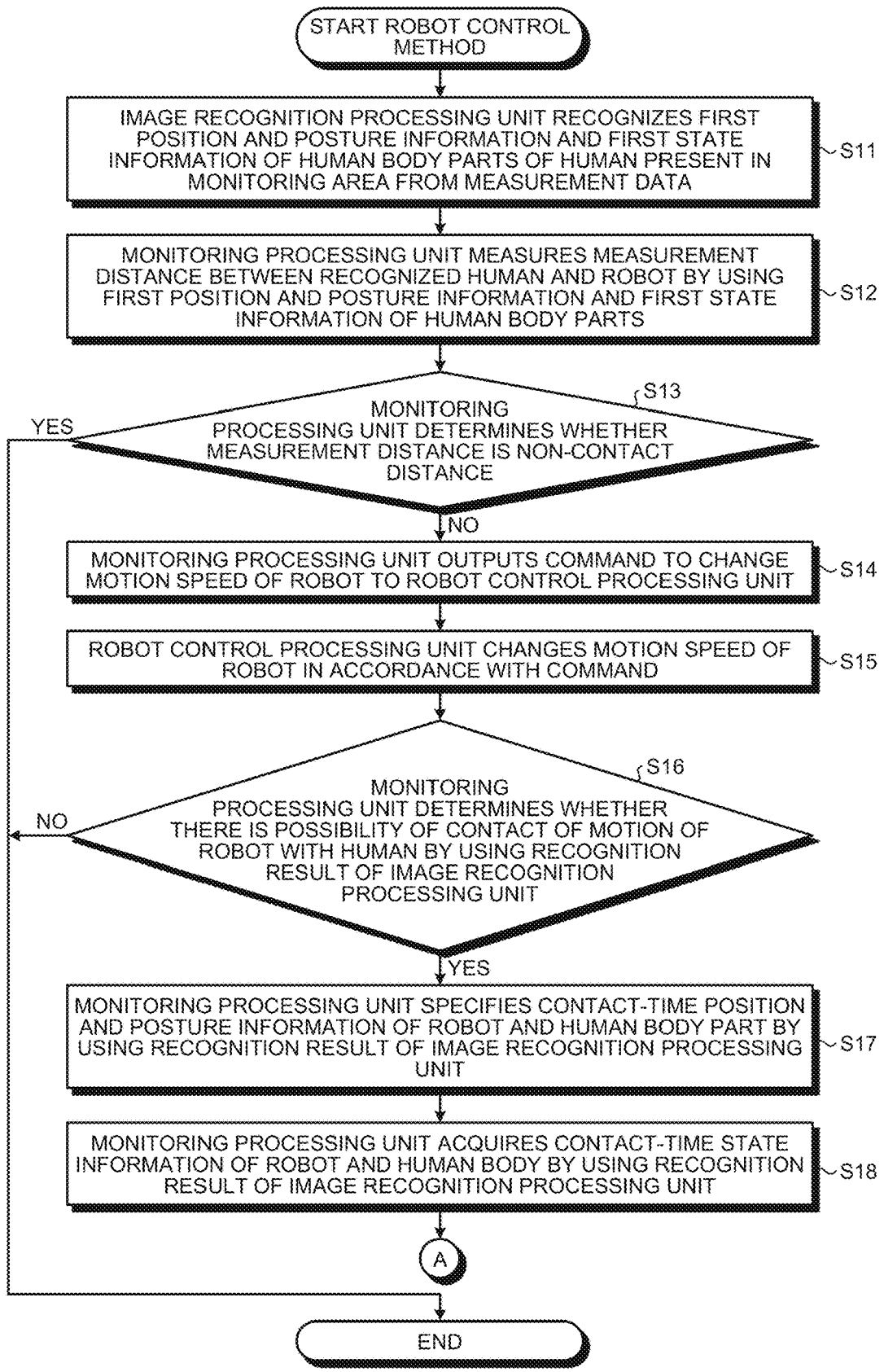
FIG. 3 is a flowchart illustrating an example of a procedure of a robot control method according to the first embodiment.
Figure 4:
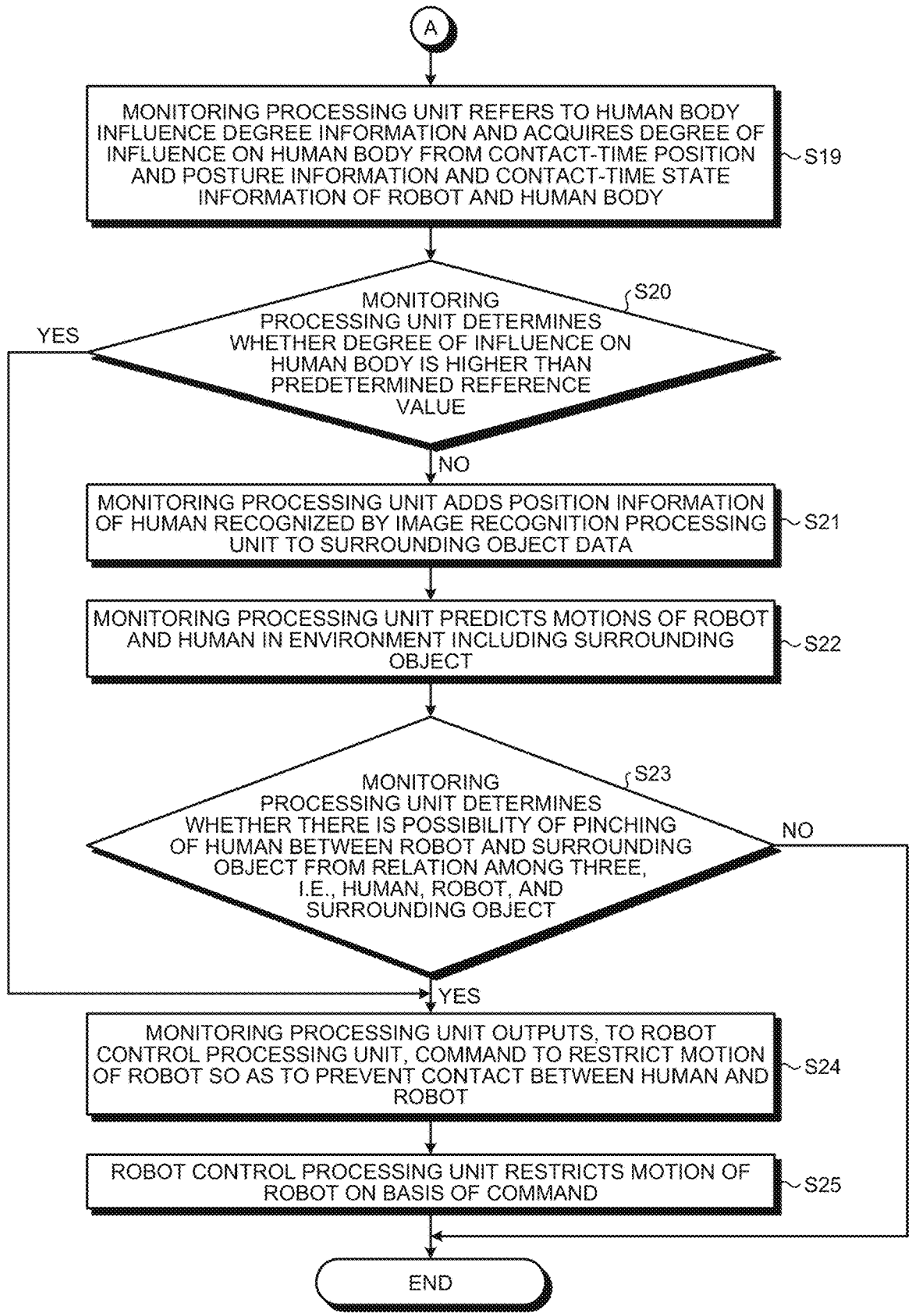
FIG. 4 is a flowchart illustrating an example of the procedure of the robot control method according to the first embodiment.

Next, the operation of the robot control device 30 in the robot system 1 having such a configuration will be described. FIGS. 3 and 4 are each a flowchart illustrating an example of a procedure of a robot control method according to the first embodiment. A description will be given for a process based on the assumption that a human is present in the monitoring area.

First, the vision sensor 20 images the monitoring area, and transmits, to the robot control device 30, measurement data that is data obtained by the imaging. The image recognition processing unit 33 of the robot control device 30 recognizes, from the received measurement data, the first position and posture information and the first state information on human body parts of the human present in the monitoring area (step S11). The first position and posture information is information including the positions and postures of the human body parts, and the first state information is information including the states of the human body parts. Next, the monitoring processing unit 36 measures the measurement distance between the recognized human and the robot 10 by using the first position and posture information and the first state information on the human body parts recognized by the image recognition processing unit 33 (step S12).

After that, the monitoring processing unit 36 determines whether the measurement distance is a non-contact distance over which the human and the robot 10 do not contact each other (step S13). In one example, the non-contact distance is a distance that the robot 10 moves in response to being imaged by the vision sensor 20 until the robot 10 receives a stop signal and stops. In a case where the measurement distance is larger than the non-contact distance, the robot 10 does not come into contact with the human, and in a case where the measurement distance is smaller than the non-contact distance, the robot 10 may come into contact with the human.

If the measurement distance is larger than the non-contact distance (Yes in step S13), there is no possibility of contact of the robot 10 with the human, and therefore, the monitoring processing unit 36 does not restrict the motion of the robot 10, continues the motion in the current motion program, and ends the process.

If the measurement distance is smaller than the non-contact distance (No in step S13), the monitoring processing unit 36 outputs, to the robot control processing unit 32, a command to change the motion speed of the robot 10 (step S14). When receiving the command, the robot control processing unit 32 changes the motion speed of the robot 10 in accordance with the command (step S15). Specifically, the monitoring processing unit 36 outputs a deceleration command to the robot control processing unit 32 in order to decelerate the motion speed of the robot 10. The motion speed of the robot 10 included in the deceleration command, which is, for example, 0.25 m/s, is such a motion speed that even when the robot 10 comes into contact with the human, there is no substantial effect on the human body at the contact part.

Next, using the recognition result of the image recognition processing unit 33, the monitoring processing unit 36 determines whether there is a possibility of contact of the motion of the robot 10 with the human (step S16). In one example, in step S11, the image recognition processing unit 33 recognizes the second position and posture information and the second state information on the parts of the robot 10, predicts the motions of the human and the robot 10 by using the first position and posture information and the first state information on the human body parts and the second position and posture information and the second state information on the parts of the robot 10, and determines the possibility of contact between the robot 10 and the human. Alternatively, in another example, a combination of a simulation of allowing the robot 10 to move in accordance with the motion program and the prediction using the first position and posture information and the first state information on the human body parts is used for determining the possibility of contact between the robot 10 and the human.

If the monitoring processing unit 36 determines that there is no possibility of contact of the motion of the robot 10 with the human (No in step S16), the monitoring processing unit 36 allows the robot 10 to continue the motion thereof, maintaining the motion speed of the robot 10 changed in step S15, and ends the process. If the monitoring processing unit 36 determines that there is the possibility of contact of the motion of the robot 10 with the human (Yes in step S16), the monitoring processing unit 36 specifies the contact-time position and posture information on the robot 10 and the human body part by using the recognition result of the image recognition processing unit 33 (step S17). In addition, the monitoring processing unit 36 acquires the contact-time state information on the robot 10 and the human body by using the recognition result of the image recognition processing unit 33 (step S18). Examples of the contact-time state information on the human body include a head orientation and a moving speed of the head, and a head orientation and a moving speed of the shoulder. Similarly, examples of the contact-time state information of the robot 10 include an orientation and a moving speed, of an arm distal end portion.

After that, the monitoring processing unit 36 consults the human body influence degree information and acquires the degree of influence on the human body from the contact-time position and posture information and the contact-time state information on the robot 10 and the human body (step S19). Specifically, the monitoring processing unit 36 uses a combination of the contact-time position and posture information on the robot 10 and the human body and the contact-time state information thereof as input data, and acquires, from the human body influence degree information, output data which is the degree of influence on the human body corresponding to the input data. The monitoring processing unit 36 determines whether the degree of influence on the human body is higher than a predetermined reference value (step S20). If the degree of influence on the human body is higher than the reference value, the influence such as damage on the human body is large. If the degree of influence on the human body is equal to or less than the reference value, the influence such as damage on the human body is minor. The degree of influence on the human body is associated with information such as whether a human body part with which the robot 10 comes into contact is a vital part, a motion speed of the robot 10, and a human body part that may contact the robot, the position, the state, and the like.

If the degree of influence on the human body is equal to or less than the reference value (No in step S20), the monitoring processing unit 36 adds, to the surrounding object data, the position information on the human recognized by the image recognition processing unit 33 (step S21), and predicts the motions of the robot 10 and the human in an environment including a surrounding object (step S22). In one example, the monitoring processing unit 36 simulates the motions of the robot 10 and the human by using the surrounding object data. In doing so, it is possible to use the contact-time position and posture information and the contact-time state information on the robot 10 and the human body, the motion program, and the like.

Figure 5:
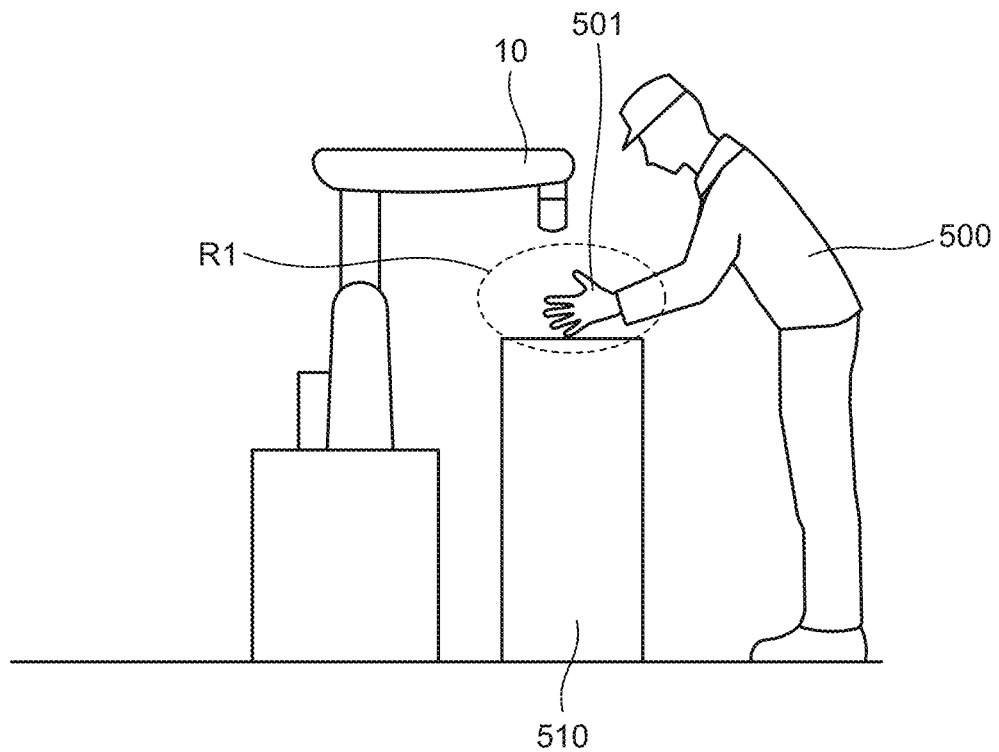
FIG. 5 is a diagram illustrating a relationship among a human, a robot, and a surrounding object.

As a result of the prediction, the monitoring processing unit 36 determines, from a relation among the three, i.e., the human, the robot 10, and the surrounding object, whether there is the possibility of pinching of the human between the robot 10 and the surrounding object (step S23). FIG. 5 is a diagram illustrating a relationship among a human, a robot, and a surrounding object. The case illustrated in this figure is where an area between the robot 10 and a workbench 510 that is a surrounding object is a pinching possibility area R1, and a hand 501 of a human 500 is present in the pinching possibility area R1. In such a case, it is determined that there is a possibility of pinching of the hand 501 of the human 500 between the robot 10 and the workbench 510.

If there is the possibility of pinching of the human between the robot 10 and the surrounding object (Yes in step S23), or if the degree of influence on the human body is higher than the reference value in step S20 (Yes in step S20), the monitoring processing unit 36 outputs, to the robot control processing unit 32, a command to restrict the motion of the robot 10 so as to prevent contact between the human and the robot 10 (step S24). When receiving the command, the robot control processing unit 32 restricts the motion of the robot 10 on the basis of the command (step S25). Examples of the restriction of the motion of the robot 10 include stop of the motion of the robot 10, further deceleration thereof, and a motion of the robot 10 in a direction away from the human. Although the monitoring processing unit 36 outputs the command to restrict the motion of the robot 10 to the robot control processing unit 32, and the robot control processing unit 32 restricts the motion of the robot 10 in steps S24 and S25, the monitoring processing unit 36 can output a warning sound in step S24. Thus, the process ends.

In a case where there is no possibility of pinching of the human between the robot 10 and the surrounding object (No in step S23), the monitoring processing unit 36 recognizes that the influence on the human body is not so serious, maintains the motion of the robot 10 as it is, and ends the process.

According to the robot control device 30 of the first embodiment, the image recognition processing unit 33 acquires the first position and posture information and the first state information on the human body parts of the human present in the monitoring area by using the measurement data from the vision sensor 20. The monitoring processing unit 36 adds the position of the human to the surrounding object data including the three-dimensional disposition states, shapes, and sizes of the robot 10 and the surrounding object, predicts the motions of the human and the robot 10, and determines whether there is the possibility of pinching of the human between the robot 10 and the surrounding object. In a case where there is the possibility of pinching of the human between the robot 10 and the surrounding object, a command to restrict the motion of the robot 10 is output to the robot control processing unit 32 so as to prevent the human from being pinched between the robot 10 and the surrounding object. As a result, it is possible to reduce a possibility that the degree of influence on the human body is increased as the human is pinched between the robot 10 and the surrounding object because of the continuation of the motion of the robot 10 even in a case where the degree of influence of the contact of the robot 10 with the human is small. In addition, since it is unlikely that the contact of the robot 10 with the human does a great deal of harm to the human, the robot 10 can be used at a distance close to the human, thus providing high versatility.

Second Embodiment

Conventionally, no one has proposed a technique of shortening a motion path of the robot 10 to a target position as much as possible as well as reducing the possibility of contact of the robot 10 with the human and the possibility of pinching of the human between the robot 10 and the surrounding object in a case where a human is present in an area where the robot 10 and a surrounding object are disposed. In a second embodiment, a description will be given for a robot control device capable of shortening the motion path of the robot 10 to the target position as much as possible as well as reducing the possibility of contact of the robot 10 with the human and the possibility of pinching of the human between the robot 10 and the surrounding object.

Figure 6:
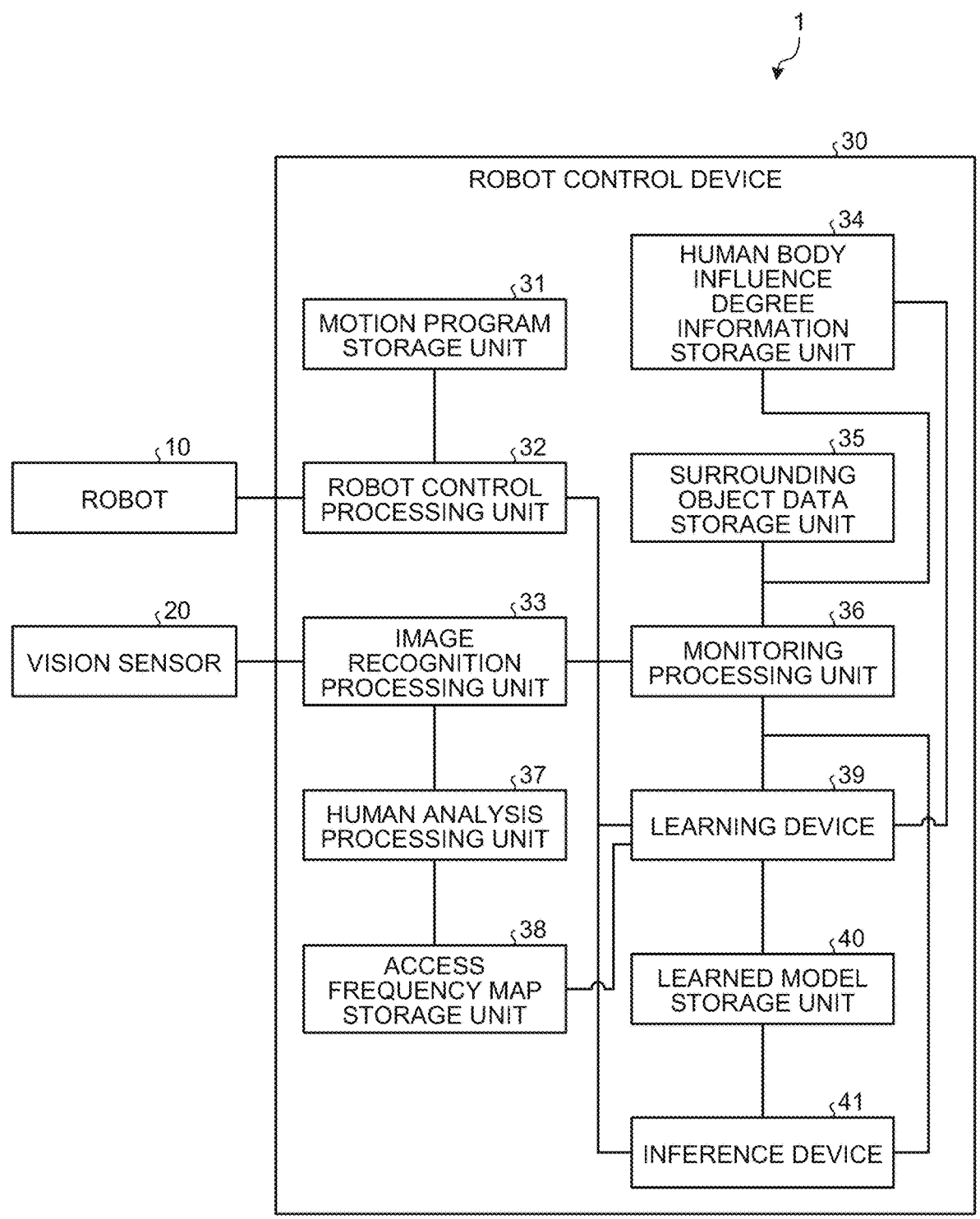
FIG. 6 is a block diagram illustrating an example of a configuration of the robot system including the robot control device according to a second embodiment.

FIG. 6 is a block diagram illustrating an example of a configuration of the robot system including the robot control device according to the second embodiment. The same components as those in the first embodiment are denoted by the same reference numerals, and the descriptions thereof will be omitted. In addition to the configuration of the first embodiment, the robot control device 30 further includes a human analysis processing unit 37, an access frequency map storage unit 38, a learning device 39, a learned model storage unit 40, and an inference device 41.

Figure 7:
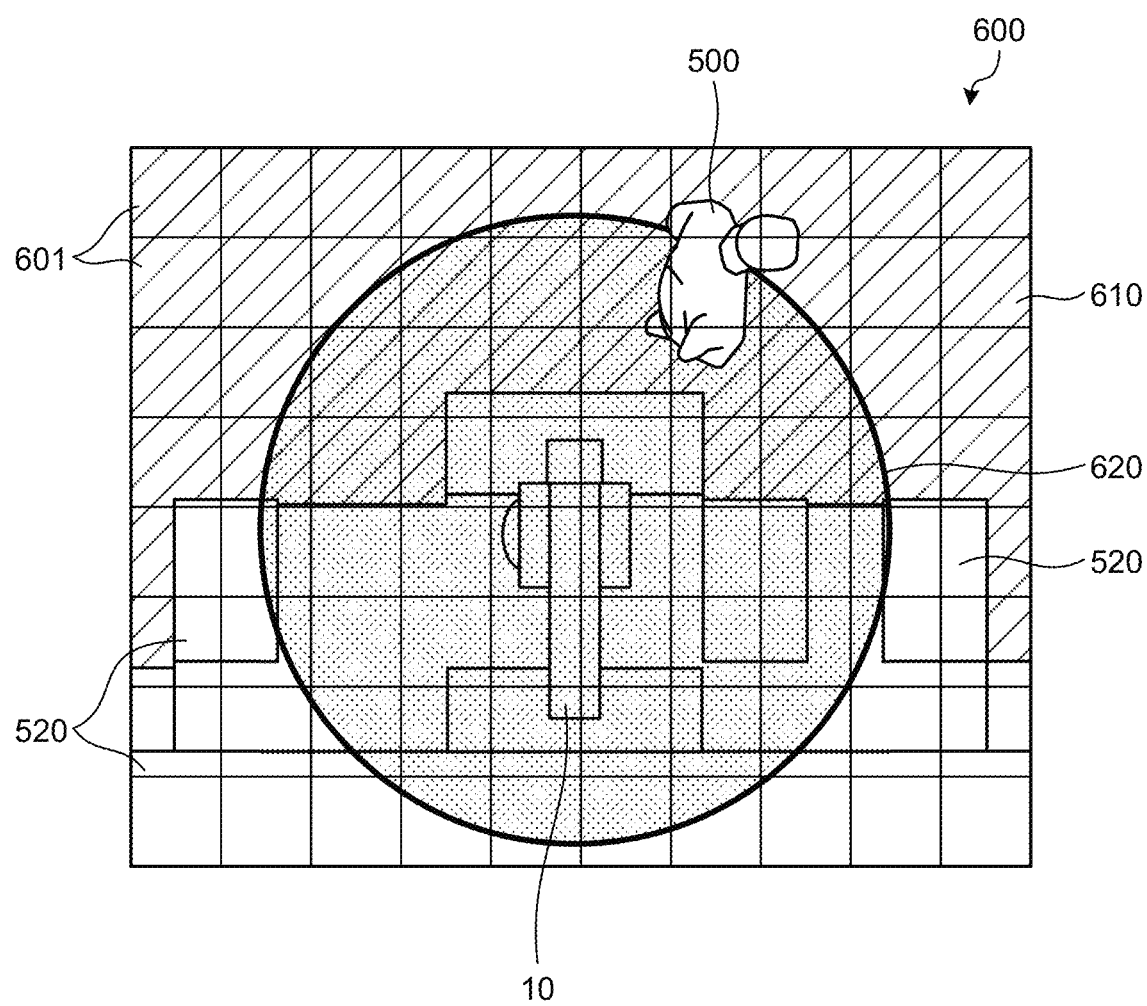
FIG. 7 is a diagram for explaining a method for generating an access frequency map.

The human analysis processing unit 37 generates an access frequency map from the recognition result of the image recognition processing unit 33. The access frequency map is information indicating an access situation of the human in the monitoring area in a predetermined period of time. FIG. 7 is a diagram for explaining a method for generating the access frequency map. FIG. 7 illustrates image data 600 on the monitoring area imaged by the vision sensor 20. FIG. 7 illustrates the image data 600 obtained by imaging the monitoring area from above. The image data 600 of the monitoring area is divided into a plurality of rectangular small areas 601. In the image data 600 in FIG. 7, a generally lower half is an area where the robot 10 and surrounding objects 520 are disposed, and a generally upper half is an area 610 where the human 500 can move. A circular area centered on the position of the robot 10 is a robot moving area 620 which is a range in which parts of the robot 10 can move.

In an initial state, the access frequency of each small area 601 is 0. The human analysis processing unit 37 determines to which small area 601 the position of the human 500 recognized by the image recognition processing unit 33 belongs, and adds "1" to the access frequency of the small area 601 to which the human 500 belongs. The human analysis processing unit 37 generates the access frequency map by performing this process for a predetermined period of time.

FIG. 8 is a diagram illustrating an example of the access frequency map. The access frequency map of FIG. 8 is generated from the image data 600 of the monitoring area in FIG. 7. The above discussed process is performed to thereby provide each of small areas 601 with the frequency at which the human 500 has belonged, as illustrated in FIG. 8. Referring to the access frequency map makes it possible to know at which position in the monitoring area the human 500 is likely to be present.

The access frequency map storage unit 38 stores the access frequency map in the monitoring area generated by the human analysis processing unit 37. The access frequency map is data prepared for machine learning.

On the basis of the motion path of the robot 10 and the states of the human 500, the robot 10, and the surrounding objects 520, the learning device 39 generates a learned model for learning the motion path of the robot 10 which prevents the deceleration or stop of the motion of the robot 10 and prevents the contact of the robot 10 with the human 500 and the pinching of the human 500 between the robot 10 and any of the surrounding objects 520.

The learned model storage unit 40 stores the learned model learned by the learning device 39.

The inference device 41 inputs a target position of the robot 10 and the states of the robot 10, the human 500, and the surrounding objects 520 to the learned model stored in the learned model storage unit 40, thereby inferring the motion path of the robot 10 suitable for the states of the robot 10, the human 500, and the surrounding objects 520.

Learning by the learning device 39 and inference by the inference device 41 will be hereinafter described in detail.

<Learning Phase>

Figure 9:
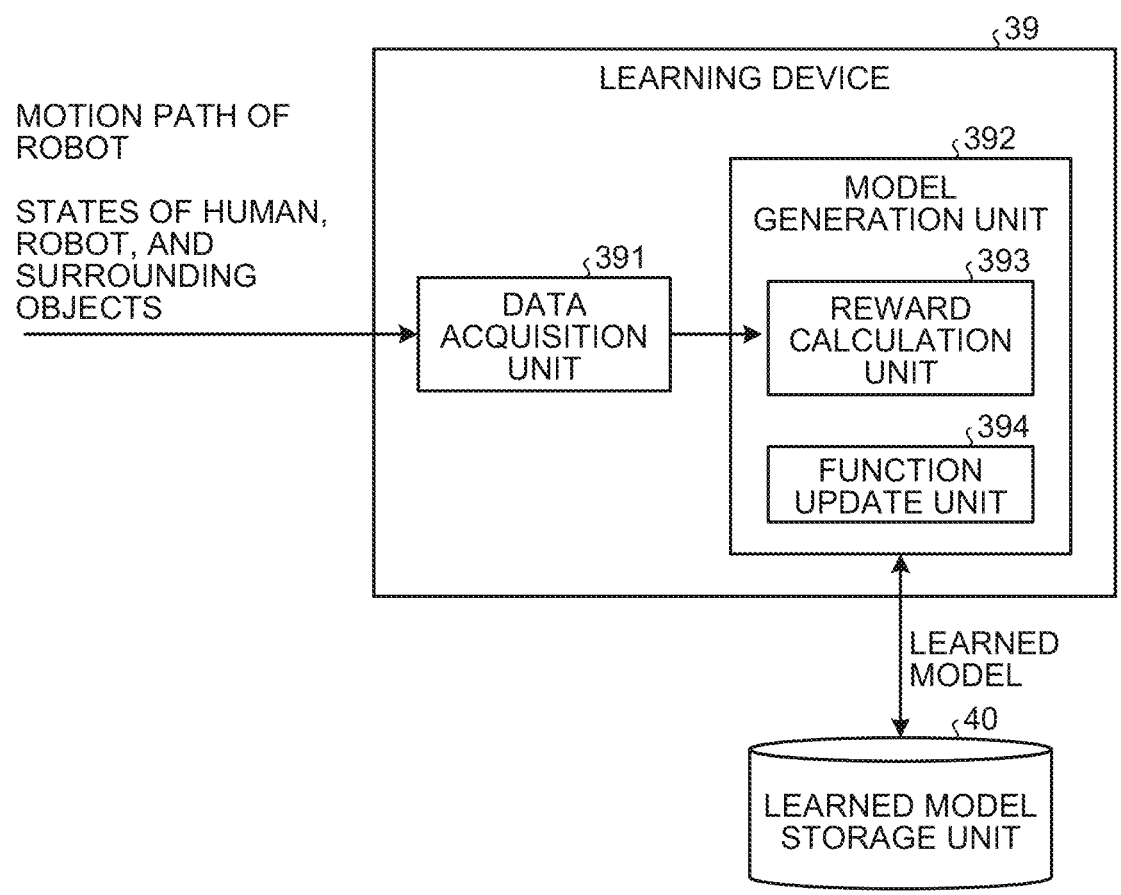
FIG. 9 is a block diagram illustrating an example of a configuration of a learning device in the robot control device according to the second embodiment.

FIG. 9 is a block diagram illustrating an example of a configuration of the learning device in the robot control device according to the second embodiment. The learning device 39 includes a data acquisition unit 391 and a model generation unit 392.

The data acquisition unit 391 acquires learning data. The learning data is a motion path of the robot 10 and state data indicating states of the human 500, the robot 10, and surrounding objects. The state data includes the first information on the human 500, the target position and the second information on the robot 10, and the surrounding object data. The description will be made below assuming that the first information is the first position and posture information and the second information is the second position and posture information. The motion path and the target position of the robot 10 can be obtained by simulating the motion program. The motion path of the robot 10 is a motion path in the states of the human 500, the robot 10, and the surrounding objects 520. That is, the motion path of the robot 10 is a motion path in a combination of the first position and posture information on the human 500, the robot target position and the second position and posture information on the robot 10, and the surrounding object data.

On the basis of the learning data including the motion path of the robot 10 and the state data, the model generation unit 392 learns, from the states of the robot 10, the human 500, and the surrounding objects 520, the motion path of the robot 10 which prevents the deceleration or stop of the motion of the robot 10 and prevents the contact of the robot with the human 500 and the pinching of the human 500 between the robot 10 and any of the surrounding objects 520. That is, the model generation unit 392 generates the learned model for inferring, from the states of the human 500, the robot 10, and the surrounding objects 520, the motion path of the robot 10 which reduces the possibilities of contact with the human 500 and pinching of the human 500.

A learning algorithm used by the model generation unit 392 can be a known algorithm such as supervised learning, unsupervised learning, or reinforcement learning. An example in which reinforcement learning is applied will be described. In reinforcement learning, an agent as a subject of an action in a certain environment observes a parameter of the environment which is the current state, and decides what action to take. The environment dynamically changes by the action of the agent, and a reward is given to the agent depending on the change in the environment. The agent repeats the above, and learns, through a series of actions, an action policy that maximizes the reward. Q-learning, TD-learning, and the like are known as typical methods of reinforcement learning. For example, in the case of Q-learning, a general update formula for an action-value function Q(s, a) is expressed by the following formula (1).

Formula 1

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In formula (1), s t represents a state of an environment $a_t$ time t, and a t represents an action $a_t$ time t. The state is changed to $s_{t+1}$ by action $a_t$. $r_{t+1}$ represents a reward acquired by the change in the state, γ represents a discount factor, and α represents a learning coefficient. The range of γ is 0<γ≤1, and the range of α is 0<α≤1. The motion path of the robot 10 becomes action $a_t$. The states of the human 500, the robot 10, and the surrounding objects 520 become state $s_t$. The best action $a_t$ in state $s_t$ $a_t$ time t is learned.

The update formula expressed by formula (1) increases an action value Q if an action value Q of action "a" with a highest Q value $a_t$ time t+1 is larger than an action value Q of action "a" executed $a_t$ time t, and decreases the action value Q if opposite is true. In other words, the action-value function Q(s, a) is updated so that the action value Q of action "a" $a_t$ time t approaches the best action value Q $a_t$ time t+1. Consequently, the best action value Q in a certain environment will be sequentially propagated to action values Q in the previous environments.

In a case where the learned model is generated by reinforcement learning as described above, the model generation unit 392 includes a reward calculation unit 393 and a function update unit 394.

The reward calculation unit 393 calculates a reward on the basis of the motion path of the robot 10 and the states of the human 500, the robot 10, and the surrounding objects 520. The reward calculation unit 393 calculates a reward r on the basis of $a_t$ least one reward criterion among: the motion time of the robot 10; the degree of influence on the human body when the robot 10 comes into contact with the human 500; and the access frequency of the human 500 in the robot moving area 620. In one example, the motion time of the robot 10 is a time required to move from a certain position A to another position B. The position B is a destination, or target position. Since the shorter the motion time of the robot 10, the higher the productivity, the motion time is preferably shorter. A possible method for shortening the motion time includes a method for increasing the motion speed of the robot 10, and a method for shortening the motion path of the robot 10.

For example, in a case where the motion time of the robot 10 decreases, in a case where the degree of influence on the human body $a_t$ the time of contact is low, or in a case where the access frequency of the human 500 is low, the reward calculation unit 393 increases the reward r. In one example, the reward calculation unit 393 increases the reward r by giving "1" which is a value of the reward. Note that the value of the reward is not limited to "1". On the other hand, in a case where the motion time of the robot 10 increases, in a case where the degree of influence on the human body $a_t$ the time of contact is high, or in a case where the access frequency of the human 500 is high, the reward calculation unit 393 decreases the reward r. In one example, the reward calculation unit 393 decreases the reward r by giving "−1" which is a value of the reward. Note that the value of the reward is not limited to "−1".

A reward criteria defined as a combination of the motion time of the robot 10, the degree of influence on the human body when the robot 10 comes into contact with the human 500, and the access frequency of the human 500 in the robot moving area 620 can provide efficient learning.

In accordance with the reward calculated by the reward calculation unit 393, the function update unit 394 updates a function for determining the motion path of the robot 10, and outputs the function to the learned model storage unit 40. For example, in the case of Q learning, the action-value function $Q(s_t, a_t)$ expressed by formula (1) is used as a function for calculating the motion path of the robot 10. The above learning is repeatedly executed.

The learned model storage unit 40 stores the action-value function Q $(s_t, a_t)$ updated by the function update unit 394. That is, the learned model storage unit stores the learned model.

Figure 10:
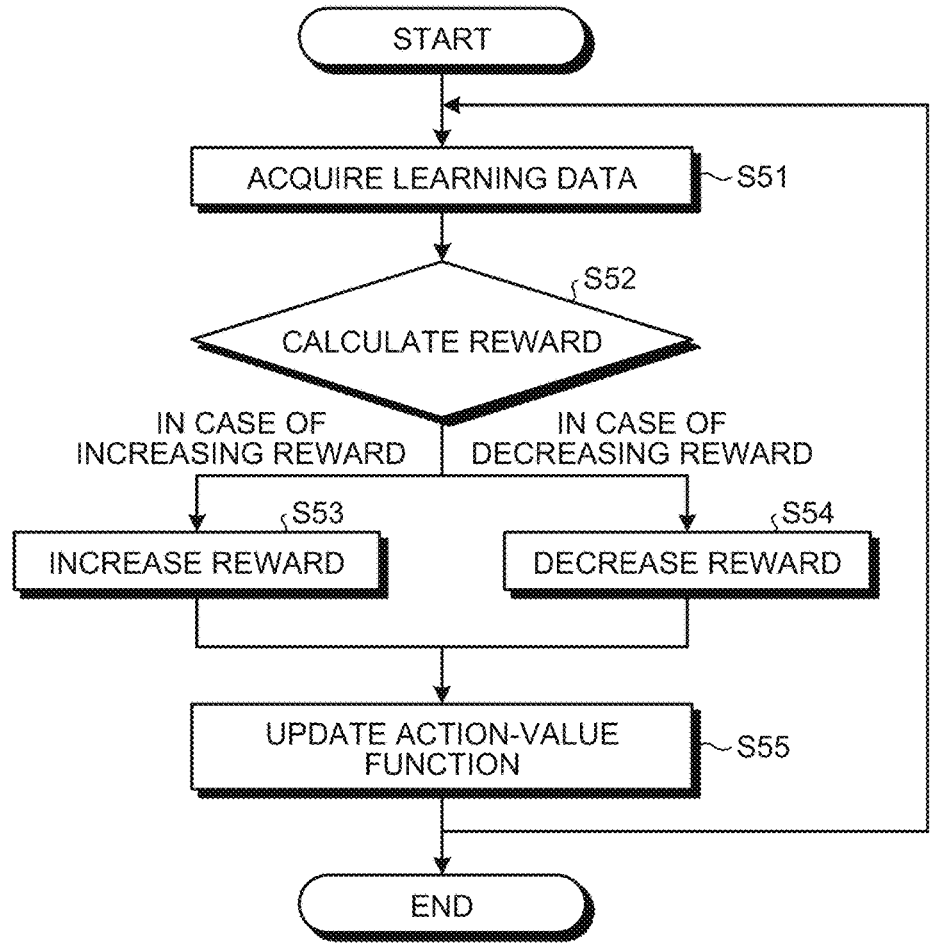
FIG. 10 is a flowchart illustrating an example of a procedure of a learning process performed by the learning device included in the robot control device according to the second embodiment.

Next, a process in which the learning device 39 learns will be described. FIG. 10 is a flowchart illustrating an example of a procedure of a learning process performed by the learning device included in the robot control device according to the second embodiment.

First, the data acquisition unit 391 acquires learning data (step S51). That is, the data acquisition unit 391 acquires the motion path of the robot 10, and state data indicating the states of the human 500, the robot 10, and the surrounding objects 520. In one example, the state data includes the first position and posture information on the human 500, the target position and the second position and posture information on the robot 10, and the surrounding object data.

Next, the model generation unit 392 calculates a reward on the basis of the motion path of the robot 10 and the state data indicating the states of the human 500, the robot 10, and the surrounding objects 520, and determines whether to increase the reward (step S52). Specifically, the reward calculation unit 393 acquires the motion path of the robot 10 and the states of the human 500, the robot 10, and the surrounding objects 520, and determines whether to increase the reward or decrease the reward on the basis of a predetermined reward criterion which is $a_t$ least one of: the motion time of the robot 10; the degree of influence on the human body when the robot 10 comes into contact with the human 500; and the access frequency of the human 500 in the robot moving area 620.

If the reward calculation unit 393 determines to increase the reward in step S52, the reward calculation unit 393 increases the reward (step S53). On the other hand, if the reward calculation unit 393 determines to decrease the reward in step S52, the reward calculation unit 393 decreases the reward (step S54).

After step S53 or S54, on the basis of the reward calculated by the reward calculation unit 393, the function update unit 394 updates the action-value function Q $(s_t, a_t)$ expressed by formula (1) stored in the learned model storage unit 40 (step S55).

The learning device 39 repeatedly executes the processes from steps S51 to S55 described above, and stores a learned model, i.e., the generated action-value function $Q(s_t, a_t)$ in the learned model storage unit 40.

Although the learning device 39 according to the second embodiment stores the learned model in the learned model storage unit 40 provided outside the learning device 39, the learned model storage unit 40 can be provided inside the learning device 39.

<Utilization Phase>

Figure 11:
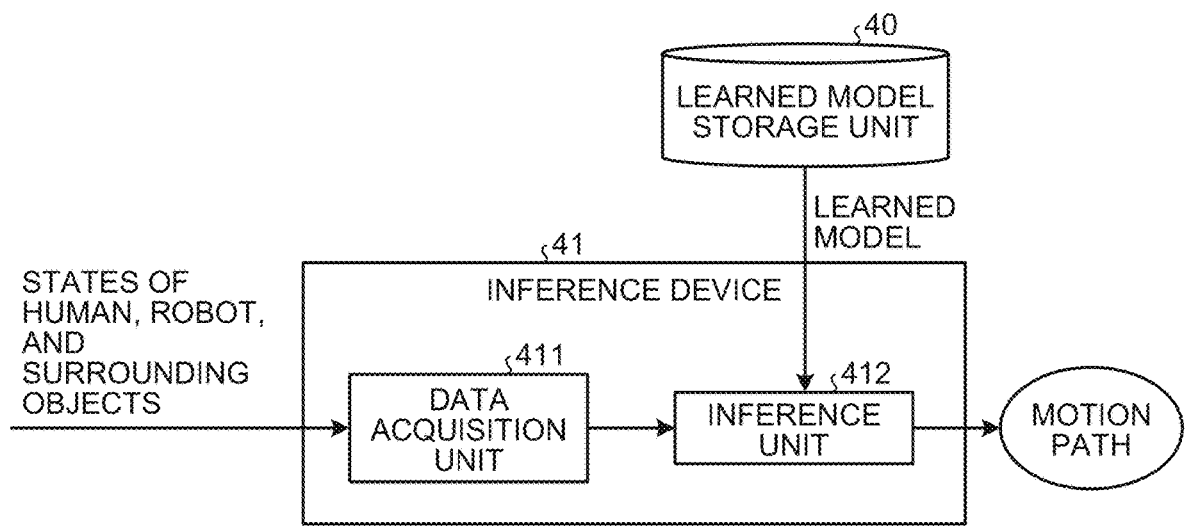
FIG. 11 is a block diagram illustrating an example of a configuration of an inference device in the robot control device according to the second embodiment.

FIG. 11 is a block diagram illustrating an example of a configuration of the inference device in the robot control device according to the second embodiment. The inference device 41 includes a data acquisition unit 411 and an inference unit 412.

The data acquisition unit 411 acquires state data indicating the states of the human 500, the robot 10, and the surrounding objects 520. In one example, the state data includes the first position and posture information on the human 500, the target position and the second position and posture information on the robot 10, and the surrounding object data.

The inference unit 412 uses the learned model to infer the motion path of the robot 10. In other words, by inputting the state data acquired by the data acquisition unit 411, that is, by inputting the states of the human 500, the robot 10, and the surrounding objects 520 to the learned model, the inference unit 412 can infer the motion path of the robot 10 suitable in particular for the states of the human 500, the robot 10, and the surrounding objects 520.

Note that although the motion path of the robot has been described as being output using the learned model learned by the model generation unit 392 of the learning device 39 of the robot control device 30, the motion path of the robot 10 can be output on the basis of a learned model acquired from another robot system 1.

Figure 12:
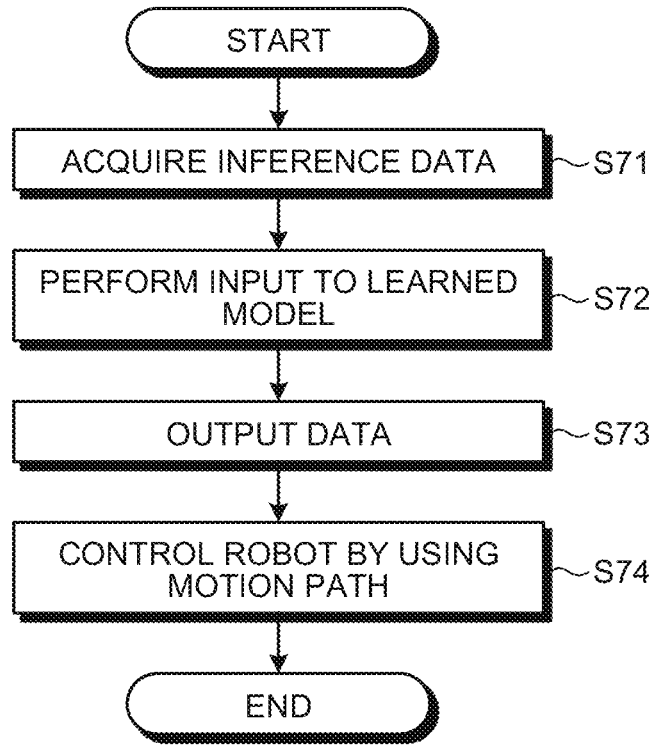
FIG. 12 is a flowchart illustrating an example of a procedure of an inference process performed by the inference device of the robot control device according to the second embodiment.

Next, a process for the inference device 41 to obtain the motion path of the robot 10 will be described. FIG. 12 is a flowchart illustrating an example of a procedure of an inference process performed by the inference device of the robot control device according to the second embodiment.

First, the data acquisition unit 411 acquires inference data (step S71). That is, the data acquisition unit 411 acquires state data indicating the states of the human 500, the robot 10, and the surrounding objects 520.

Next, the inference unit 412 inputs the state data which is inference data, that is, the states of the human 500, the robot 10, and the surrounding objects 520 to the learned model stored in the learned model storage unit (step S72), and obtains the motion path of the robot 10. After that, the inference unit 412 outputs, to the robot control processing unit 32, the obtained motion path of the robot 10 which is data (step S73).

Then, the robot control processing unit 32 controls the robot 10 by using the output motion path of the robot 10 (step S74). This makes it possible to prevent the deceleration or stop of the motion of the robot 10 and reduce the degree of influence on the human body. It thus becomes possible to control the robot 10 to achieve not only the reduction in the degree of influence on the human body of the human 500 and the prevention of the pinching of the human 500 but also the improvement of the utilization rate of the robot 10, thereby providing the robot system 1 with high versatility.

Note that the second embodiment has been described as using where reinforcement learning as the learning algorithm used by the inference unit 412, but the learning algorithm is not limited thereto. Other learning than the reinforcement learning, such as supervised learning, unsupervised learning, or semi-supervised learning can be used as the learning algorithm.

Deep learning that learns extraction of feature quantities themselves can also be used as a learning algorithm used in the model generation unit 392, and machine learning can be performed in accordance with another known method, for example, a neural network, genetic programming, functional logic programming, or a support vector machine.

Note that although FIG. 6 illustrates the learning device 39 and the inference device 41 both of which are built in the robot control device 30, the learning device 39 and the inference device 41 can be connected to the robot control device 30 via a network, for example, and can be devices separate from the robot control device 30. The learning device 39 and the inference device 41 can be present on a cloud server.

Furthermore, the model generation unit 392 can learn the motion path of the robot 10 by using learning data acquired from a plurality of robot control devices 30. Note that the model generation unit 392 can acquire learning data from a plurality of robot control devices 30 used in the same area, or can learn the motion path of the robot 10 by using learning data collected from a plurality of robot control devices 30 that independently operate in different areas. It is possible to add, in the middle of the learning, the robot control device 30 as a target from which the learning data is collected, or to exclude the robot control device 30 from such targets. Furthermore, the learning device 39 that has learned the motion path of the robot 10 for a certain robot control device 30 can be applied to another robot control device 30, and the motion path of the robot 10 may be relearned for the another robot control device 30 and updated.

In the second embodiment, on the basis of the learning data including the motion path of the robot 10 and the state data, the learning device 39 learns, from the states of the human 500, the robot 10, and the surrounding objects 520, the motion path of the robot 10 which prevents the deceleration or stop of the motion of the robot 10 and prevents the contact of the robot with the human 500 and the pinching of the human 500. This produces an effect of learning, from the states of the human 500, the robot 10, and the surrounding objects 520, the motion path of the robot 10 which prevents the deceleration or stop of the motion of the robot 10 and reduces the degree of influence on the human body.

In addition, in the second embodiment, using the learned model, the inference device 41 infers, from the states of the human 500, the robot 10, and the surrounding objects 520, the motion path of the robot 10 which prevents the deceleration or stop of the motion of the robot 10 and reduces the degree of influence on the human body, and outputs the motion path to the robot control processing unit 32. This makes it possible to provide the highly versatile robot system 1 that achieves both the reduction in the degree of influence on the human body and the improvement in the utilization rate of the robot 10.

Figure 13:
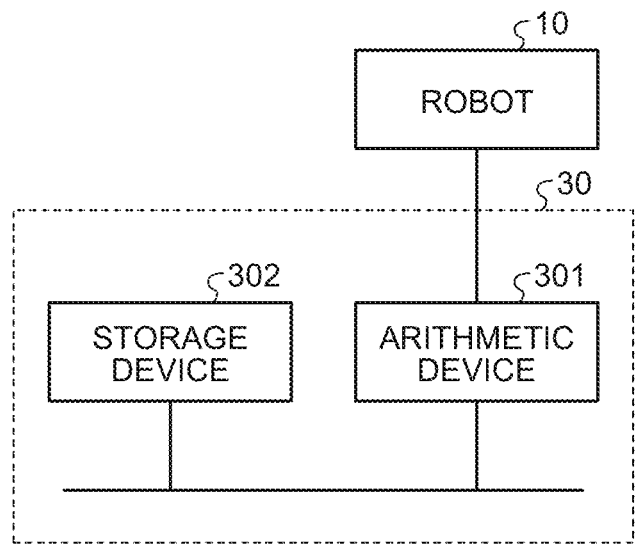
FIG. 13 is a block diagram illustrating an example of a hardware configuration of the robot control device according to the first and second embodiments.

A hardware configuration of the robot control device 30 illustrated in FIGS. 1 and 6 will be described. FIG. 13 is a block diagram illustrating an example of a hardware configuration of the robot control device 30 according to the first and second embodiments.

The robot control device 30 can be implemented by a hardware configuration including an arithmetic device 301 and a storage device 302. Examples of the arithmetic device 301 include a central processing unit (CPU, also referred to as a processing device, a microprocessor, a microcomputer, a processor, or a digital signal processor (DSP)), and system large scale integration (LSI). Examples of the storage device 302 include a random access memory (RAM) and a read only memory (ROM).

The robot control device 30 is implemented by the arithmetic device 301 reading and executing a program stored in the storage device 302 for performing an operation of the robot control device 30. It can also be said that the program causes the computer to execute procedures or methods of the robot control device 30, in one example, the robot control method illustrated in FIGS. 3 and 4.

The storage device 302 stores the motion program, the human body influence degree information, the surrounding object data, the access frequency map, and the learned model. The storage device 302 is also used as a temporary memory when the arithmetic device 301 executes various processes.

The program to be executed by the arithmetic device 301 may be stored in a computer-readable storage medium as a file in an installable format or an executable format and provided as a computer program product. The program to be executed by the arithmetic device 301 may be provided to the robot control device 30 via a network such as the Internet.

The robot control device 30 may be realized by dedicated hardware. A part of functions of the robot control device 30 can be implemented by dedicated hardware and another part thereof can be implemented by software or firmware.

The configurations described in the embodiments above are merely examples and can be combined with other known technology, embodiments can be combined with each other, and part of the configurations can be omitted or modified without departing from the gist thereof.

REFERENCE SIGNS LIST 1 robot system; 10 robot; 20 vision sensor; 30 robot control device; 31 motion program storage unit; 32 robot control processing unit; 33 image recognition processing unit; 34 human body influence degree information storage unit; 35 surrounding object data storage unit; 36 monitoring processing unit; 37 human analysis processing unit; 38 access frequency map storage unit; 39 learning device; 40 learned model storage unit; 41 inference device; 391, 411 data acquisition unit; 392 model generation unit; 393 reward calculation unit; 394 function update unit; 412 inference unit; 500 human; 501 hand; 510 workbench; 520 surrounding object; 600 image data; 601 small area; 620 robot moving area.

The invention claimed is:

1. A robot control device to control a robot that operates sharing a work area with a human, the robot control device comprising:
    image recognition processing circuitry to recognize first information on a basis of measurement data in a monitoring area obtained from a vision sensor, the first information being information about a human present in the monitoring area;
    robot control processing circuitry to control a motion of the robot in accordance with a motion program for moving the robot; and
    monitoring processing circuitry to:
    add position information on the human and human body parts, to surrounding object data, on a basis of the first information obtained from the image recognition processing circuitry, the surrounding object data indicating three-dimensional disposition states of the robot and a surrounding object in the monitoring area and including positions, shapes, and sizes thereof, the surrounding object being an object other than the robot;
    on a basis of the post-addition data, predict motions of the human and the robot in an environment including the surrounding object; and
    determine, from a positional relationship among the robot, the surrounding object, and the human, a possibility of pinching of the human between the robot and the surrounding object depending on whether the human is present a, a position where the human is pinched, the positional relationship using coordinates on the surrounding object data obtained by the prediction.

2. The robot control device according to claim 1, wherein the image recognition processing circuitry further recognizes second information that is information about the robot, and
    the monitoring processing circuitry adds, to the surrounding object data, the position information on the human on a basis of the first information and information on the robot on a basis of the second information, and determines the possibility of pinching of the human between the robot and the surrounding object, on a basis of the post-addition data.

3. The robot control device according to claim 2, wherein the second information includes second position and posture information and second state information, the second position and posture information including a position of the robot and a posture of the robot, the second state information including a moving direction of the robot and a speed of the robot, and
    the monitoring processing circuitry predicts a motion of the robot from the second position and posture information and the second state information.

4. The robot control device according to claim 1, wherein the monitoring processing circuitry predicts a motion of the human from the first information, predicts a motion of the robot from the motion program, and determines the possibility of pinching of the human between the robot and the surrounding object.

5. The robot control device according to claim 2, wherein the first information includes first position and posture information and first state information, the first position and posture information including a position of the human and a posture of the human, the first state information including a moving direction of the human and a speed of the human, and
    the monitoring processing circuitry predicts a motion of the human from the first position and posture information and the first state information.

6. The robot control device according to claim 5, wherein the first position and posture information includes positions of human body parts and postures of human body parts,
    the first state information includes moving directions of the human body parts and speeds of the human body parts,
    the robot control device further comprises human body influence degree information storage circuitry to store human body influence degree information indicating a degree of influence on a human body in each of the human body parts in a case where the robot comes into contact with the human due to a motion of the robot, and
    the monitoring processing circuitry predicts contact parts and contact states between the robot and the human body parts from predicted motions of the human body parts and a predicted motion of the robot, acquires, from the human body influence degree information, the degree of influence on the human body corresponding to the predicted contact parts and the predicted contact states, and outputs a command of a motion of the robot to the robot control processing circuitry in accordance with the acquired degree of influence on the human body.

7. The robot control device according to claim 1, wherein the monitoring processing circuitry is configured to output, to the robot control processing circuitry, a command to restrict a motion of the robot in a case where there is the possibility of pinching of the human, and
a command to restrict a motion of the robot is stop of the robot, deceleration of the robot, or a motion of the robot in a direction away from the human.

8. The robot control device according to claim 1, wherein in a case where there is the possibility of pinching of the human, the monitoring processing circuitry outputs, to the robot control processing circuitry, a command to restrict a motion of the robot or outputs a warning sound.

9. The robot control device according to claim 1, further comprising:
a learning device including:
data acquisition circuitry to acquire learning data including state data indicating states of the human, the robot, and the surrounding object, and a motion path of the robot in the states of the human, the robot, and the surrounding object; and
model generation circuitry to generate, by using the learning data, a learned model for inferring, from the state data, a motion path of the robot which prevents deceleration or stop of a motion of the robot and reduces possibilities of contact of the robot with the human and pinching of the human between the robot and the surrounding object, wherein
the state data includes the first information, a target position of the robot, second information that is information about the robot, and the surrounding object data.

10. The robot control device according to claim 2, further comprising:
a learning device including:
data acquisition circuitry to acquire learning data including state data indicating states of the human, the robot, and the surrounding object, and a motion path of the robot in the states of the human, the robot, and the surrounding object; and
model generation circuitry to generate, by using the learning data, a learned model for inferring, from the state data, a motion path of the robot which prevents deceleration or stop of a motion of the robot and reduces possibilities of contact of the robot with the human and pinching of the human between the robot and the surrounding object, wherein
the state data includes the first information, a target position of the robot, the second information, and the surrounding object data.

11. The robot control device according to claim 9, wherein the model generation circuitry includes:
reward calculation circuitry to calculate a reward on a basis of a, least one reward criterion among: a motion time of the robot; a degree of influence on a human body in a case where the robot comes into contact with the human; and an access frequency of the human in a moving area of the robot; and
function update circuitry to update a function for determining a motion path of the robot, in accordance with a reward calculated by the reward calculation circuitry.

12. The robot control device according to claim 1, further comprising:
an inference device including:
data acquisition circuitry to acquire state data indicating states of the human, the robot, and the surrounding object; and
inference circuitry to output a motion path of the robot from the state data acquired by the data acquisition circuitry, by using a learned model for inferring, from the states of the human, the robot, and the surrounding object, a motion path of the robot which prevents deceleration or stop of a motion of the robot and reduces possibilities of contact of the robot with the human and pinching of the human between the robot and the surrounding object, wherein
the state data includes the first information, a target position of the robot, second information that is information about the robot, and the surrounding object data.

13. The robot control device according to claim 2, further comprising:
an inference device including:
data acquisition circuitry to acquire state data indicating states of the human, the robot, and the surrounding object; and
inference circuitry to output a motion path of the robot from the state data acquired by the data acquisition circuitry, by using a learned model for inferring, from the states of the human, the robot, and the surrounding object, a motion path of the robot which prevents deceleration or stop of a motion of the robot and reduces possibilities of contact of the robot with the human and pinching of the human between the robot and the surrounding object, wherein
the state data includes the first information, a target position of the robot, the second information, and the surrounding object data.

14. The robot control device according to claim 4, wherein
the first information includes first position and posture information and first state information, the first position and posture information including a position of the human and a posture of the human, the first state information including a moving direction of the human and a speed of the human, and
the monitoring processing circuitry predicts a motion of the human from the first position and posture information and the first state information.

15. The robot control device according to claim 14, wherein
the first position and posture information includes positions of human body parts and postures of human body parts,
the first state information includes moving directions of the human body parts and speeds of the human body parts,
the robot control device further comprises human body influence degree information storage circuitry to store human body influence degree information indicating a degree of influence on a human body in each of the human body parts in a case where the robot comes into contact with the human due to a motion of the robot, and
the monitoring processing circuitry predicts contact parts and contact states between the robot and the human body parts from predicted motions of the human body parts and a predicted motion of the robot, acquires, from the human body influence degree information, the degree of influence on the human body corresponding to the predicted contact parts and the predicted contact states, and outputs a command of a motion of the robot to the robot control processing circuitry in accordance with the acquired degree of influence on the human body.

* * * * *